United States Patent
Fang et al.

(10) Patent No.: US 12,490,011 B2
(45) Date of Patent: Dec. 2, 2025

(54) METHOD FOR SELECTING A RESPONSE, AN EARPHONE BASE, A METHOD OF SELECTING A WIRELESS EARPHONE, A DEVICE AND A MEDIUM

(71) Applicants: INVENTEC APPLIANCES (PUDONG) CORPORATION, Shanghai (CN); INVENTEC APPLIANCES (SHANGHAI) CO. LTD., Shanghai (CN); INVENTEC APPLIANCES CORP., New Taipei (TW)

(72) Inventors: Jun Fang, New Taipei (TW); Jing-Song Chang, New Taipei (TW); Shih-Kuang Tsai, New Taipei (TW)

(73) Assignees: Inventec Appliances (Pudong) Corporation, Shanghai (CN); Inventec Appliances (Shanghai) Co., Ltd., Shanghai (CN); Inventec Appliances Corp., New Taipei (TW)

( * ) Notice: Subject to any disclaimer, the term of this patent is extended or adjusted under 35 U.S.C. 154(b) by 210 days.

(21) Appl. No.: 18/264,003

(22) PCT Filed: Feb. 3, 2021

(86) PCT No.: PCT/CN2021/075056
§ 371 (c)(1),
(2) Date: Aug. 2, 2023

(87) PCT Pub. No.: WO2022/165667
PCT Pub. Date: Aug. 11, 2022

(65) Prior Publication Data
US 2024/0114281 A1    Apr. 4, 2024

(51) Int. Cl.
*H04R 1/10*    (2006.01)
*G06F 3/16*    (2006.01)
*H04R 1/02*    (2006.01)

(52) U.S. Cl.
CPC .......... *H04R 1/1041* (2013.01); *G06F 3/165* (2013.01); *H04R 2420/07* (2013.01)

(58) Field of Classification Search
CPC .... H04R 1/1041; H04R 2420/07; G06F 3/165
(Continued)

(56) References Cited

U.S. PATENT DOCUMENTS

2022/0078864 A1* 3/2022 Yang ................ H04L 5/0053

FOREIGN PATENT DOCUMENTS

| CN | 109600694 A | 4/2019 |
| CN | 110996405 A | 4/2020 |

(Continued)

*Primary Examiner* — Ammar T Hamid
(74) *Attorney, Agent, or Firm* — Rosenberg, Klein & Lee

(57) ABSTRACT

The present invention provides a method for selecting a response, an earphone base, a method of selecting a wireless earphone, a device and a medium. The method for selecting a response includes sending communication data to a user terminal, the communication data comprises a wireless earphone communication data and/or an earphone base communication data; detecting whether a selection command for the wireless earphone sent from the user terminal is received; and controlling the earphone base corresponding to the selection command to execute a predetermined response action. By adopting the present invention, the earphone base establishes a connection with the user terminal through its own communication function or a connected wireless earphone. The communication data of the earphone base and the wireless earphone are sent to the user terminal for the user to view. The earphone base is capable of responding when receiving the selection command. The user can quickly find the corresponding earphone base and the (Continued)

wireless earphone according to the response action, which saves the time of selecting and searching for the wireless earphone.

16 Claims, 13 Drawing Sheets

(58) Field of Classification Search
USPC .................................................. 381/74, 334
See application file for complete search history.

(56) References Cited

FOREIGN PATENT DOCUMENTS

| | | |
|---|---|---|
| CN | 111131966 A | 5/2020 |
| CN | 111986454 A | 11/2020 |
| CN | 112020048 A | 12/2020 |
| CN | 112165704 A | 1/2021 |
| CN | 112188449 A | 1/2021 |
| TW | 201740693 A | 11/2017 |

* cited by examiner

METHOD FOR SELECTING A RESPONSE, AN EARPHONE BASE, A METHOD OF SELECTING A WIRELESS EARPHONE, A DEVICE AND A MEDIUM

BACKGROUND OF THE INVENTION

1. Field of the Invention

The present invention relates to the field of data processing technology, and more particularly, to a method for selecting a response, an earphone base, a method of selecting a wireless earphone, a device and a medium.

2. Description of the Prior Art

A wireless earphone serving as the user terminal peripheral device is becoming more and more popular due to its portability and convenience. Also, the application of the wireless earphone base which is a supporting component of the wireless earphone is becoming more widespread; wherein, a TWS (True Wireless Stereo) earphone is getting more and more users' favor. The wireless earphone system generally includes two parts—a wireless earphone and an earphone base. However, when users encounter a plurality of earphone bases with the wireless earphone at the same time, it is difficult for them to quickly choose the wireless earphones they need.

The current method of selecting a wireless earphone generally refers to the user identifies the wireless earphone by showing the earphone base. However, when there are a plurality of earphone bases with similar appearance, it is difficult for the user to identify them. Another method is that the user manually opens the lid of the earphone base to connect the wireless earphone with the phone through Bluetooth, and the phone reads and identifies the wireless earphone name. However, this method requires the user to open the lids of the earphone bases one by one and identify the wireless earphone one by one, which is inconvenient for operation

SUMMARY OF THE INVENTION

In view of this, the scope of the present invention is to provide a method for selecting a response, an earphone base, a method of selecting a wireless earphone, a device and a medium simultaneously to solve the problems of the prior art. The earphone base is connected to the user terminal by its own communication function or by a wireless earphone connected to it. When the earphone base receives a selection command, the earphone base is capable of making a response, so as to facilitate the user to quickly select the wireless earphone.

The embodiment of the present invention is to provide a method for selecting a response comprising the following steps of:
  sending communication data to a user terminal, the communication data comprising a wireless earphone communication data and/or an earphone base communication data;
  detecting whether a selection command for the wireless earphone sent from the user terminal is received; and
  controlling the earphone base corresponding to the selection command to execute a predetermined response action.

In some embodiments, the step of sending the communication data to a user terminal comprises the earphone base sending communication data to the user terminal, or the wireless earphone sending communication data to the user terminal.

In some embodiments, the earphone base communication data comprises identifier information and/or status data of the earphone base, the wireless earphone communication data comprises identifier information and/or status data of the wireless earphone.

In some embodiments, the step of sending the communication data to the user terminal comprises the following steps of:
  the identifier information and the status data of the earphone base and/or the identifier information and the status data of the wireless earphone serving as the communication data sent to the user terminal through the earphone base or the wireless earphone, wherein the user terminal is configured to display a selection page of the wireless earphone after receiving the communication data.

In some embodiments, the step of controlling the earphone base corresponding to the selection command to execute the predetermined response action comprises controlling the earphone base corresponding to the selection command to execute at least one of the following actions of:
  the earphone base making a responsive sound;
  the earphone base displaying a reminder information;
  the earphone base opening a lid; and
  the earphone base notifying the wireless earphone to pair with and connect to the user terminal.

The embodiment of the present invention is to provide an earphone base for executing the method for selecting a response, and the earphone base comprises:
  a communication module, configured to send communication data to a user terminal and configured to detect whether a selection command for a wireless earphone sent from the user terminal is received, the communication data comprising a wireless earphone communication data and/or an earphone base communication data;
  a control module, configured to generate a response command when receiving the selection command; and
  a response module, configured to perform a predetermined response action when receiving the response command from the control module.

In some embodiments, the communication module establishes a connection channel with the user terminal, the communication module sends the communication data to the user terminal through the connection channel, and detects whether the selection command for the wireless earphone from the user terminal is received through the connection channel; or
  the communication module is connected to the wireless earphone, the communication data is sent to the user terminal through the wireless earphone, and detects whether the selection command for the wireless earphone from the user terminal is received through the wireless earphone.

The embodiment of the present invention is to provide a method of selecting a wireless earphone, comprising the following steps of:
  receiving communication data, and the communication data comprising a wireless earphone communication data and/or an earphone base communication data;
  generating a selection command for a wireless earphone; and sending the selection command to a corresponding earphone base configured to perform a predetermined response action when receiving the selection command.

In some embodiments, the step of receiving the communication data comprises receiving the communication data from the earphone base or a wireless earphone.

In some embodiments, the earphone base communication data comprises identifier information and/or status data of the earphone base, and the wireless earphone communication data comprises identifier information and/or status data of the wireless earphone.

In some embodiments, the step of generating the selection command for the wireless earphone comprises the following steps of:
  displaying a selection page of the wireless earphone according to the communication data;
  receiving a selection of the selection page of the wireless earphone from a user; and
  generating a selection command according to the selection from the user.

In some embodiments, the step of generating the selection command for the wireless earphone comprises the following steps of:
  selecting the wireless earphone according to the communication data and a predetermined selection strategy for the wireless earphone; and
  generating the selection command according to the selection of the wireless earphone and the earphone base.

In some embodiments, the communication data comprises status data of the wireless earphone and status data of the earphone base;
  the step of selecting the wireless earphone and the earphone base according to the communication data and the predetermined selection strategy for the wireless earphone further comprises the following steps of:
  obtaining a data weight value of the wireless earphone and a data weight value of the earphone base set in the selection strategy for the wireless earphone;
  weighting and summing up the status data of the wireless earphone and the status data of the earphone base according to the data weight value to obtain a selection parameter of the wireless earphone; and
  selecting the wireless earphone according to the selection parameter of the wireless earphone.

In some embodiments, the selection strategy for the wireless earphone comprises the data weight value of the wireless earphone and the data weight value of the earphone base for a plurality of scenarios;
  the step of obtaining the data weight value of the wireless earphone and the data weight value of the earphone base set in the selection strategy for the wireless earphone comprises the following steps of:
  obtaining the current selection of a scenario; and
  obtaining the data weight value of the wireless earphone and the data weight value of the earphone base corresponding to the currently selected scenario.

The embodiment of the present invention is to provide a wireless earphone selection device comprising:
  a processor; and
  a memory in which an executable command of the processor is stored. Wherein, the processor is configured to perform the steps of the method of selecting a wireless earphone by executing the executable command.

The embodiment of the present invention is to provide a computer-readable storage medium is configured to store a program, and the program is executed by the processor to implement the steps of the method of selecting a wireless earphone.

It should be understood that the above general description and the subsequent detailed description are exemplary and explanatory, only and do not limit the present disclosure.

The method for selecting a response, the earphone base, a method of selecting a wireless earphone, a device and a medium of the present invention have the following beneficial effects. By adopting the present invention, the earphone base establishes a connection with the user terminal through its own communication function or a connected wireless earphone, or the wireless earphone establishes a connection with the user terminal, and sends the communication data of the earphone base and/or the communication data of the wireless earphone to the user terminal for the user to view. The earphone base is capable of responding when receiving the selection command. The user can quickly find the corresponding earphone base and the wireless earphone according to the response action, which saves the time of selecting and searching for the wireless earphone.

BRIEF DESCRIPTION OF THE APPENDED DRAWINGS

Other features, objects and advantages of the present invention will become clearer by reading the detailed description of the non-limiting embodiments with reference to the following appended drawings.

DETAILED DESCRIPTION OF THE INVENTION

Figure 1:
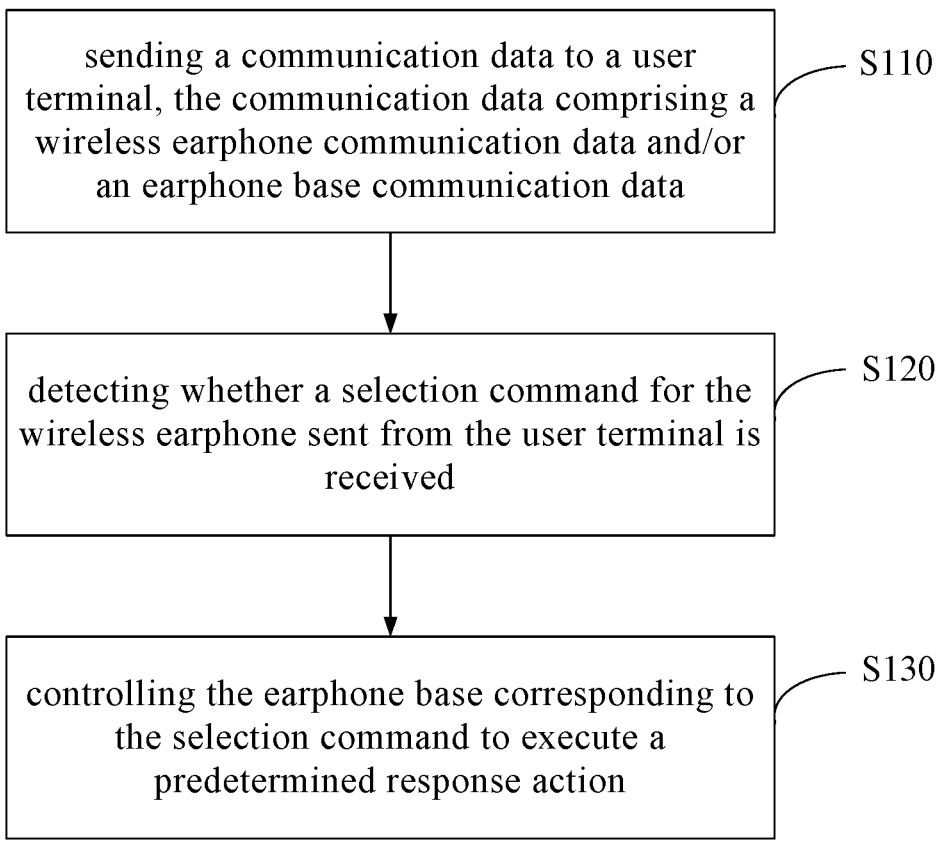
FIG. 1 is a flowchart diagram illustrating a method for selecting a response according to an embodiment of the present invention.

The exemplary embodiments will now be described more fully with reference of the appended drawings. However, the exemplary embodiments can be implemented in a variety of forms and should not be construed as limited to the embodiments presented herein; rather, providing these embodiments makes the present disclosure more comprehensive and complete, and communicates the ideas of the example implementations to those skilled in the art in a comprehensive manner. The features, structures, or characteristics described can be combined in any suitable manner in one or more implementations.

In addition, the appended drawings are only schematic illustrations of the present disclosure and are not drawing according to their actual proportion. Identical symbols in the drawings indicate identical or similar parts, and thus duplicate descriptions of them will be omitted. Some of the block diagrams shown in the appended drawings are functional entities and do not necessarily have to correspond to physically or logically separate entities. These functional entities can be implemented in software form, or in one or more hardware modules or integrated circuits, or in different network and/or processor devices and/or microcontroller devices.

The flowchart shown in the appended drawing is only an illustrative explanation and does not have to include all the steps. For example, some steps can be broken down, and some steps can be combined or partially combined, so the actual order of execution may change depending on the actual situation.

As shown in FIG. 1, the embodiment of the present invention is to provide a method for selecting a response comprising the following steps of:
- step S110: sending communication data to a user terminal, the communication data comprising a wireless earphone communication data and/or an earphone base communication data;
- step S120: detecting whether a selection command for the wireless earphone sent from the user terminal is received; and
- step S130: controlling the earphone base corresponding to the selection command to execute a predetermined response action.

By adopting a method for selecting a response of the present invention, the earphone base establishes a connection with the user terminal through its own communication function or a connected wireless earphone, or the wireless earphone establishes a connection with the user terminal. The earphone base communication data and/or the wireless earphone communication data are sent to the user terminal for the user to view by the step S110. By the step S120, when the earphone base receives the selection command, the earphone base can respond by the step S130. The user can quickly find the corresponding earphone base and the wireless earphone according to the response action, which saves the time of selecting and searching for the wireless earphone.

Figure 2:
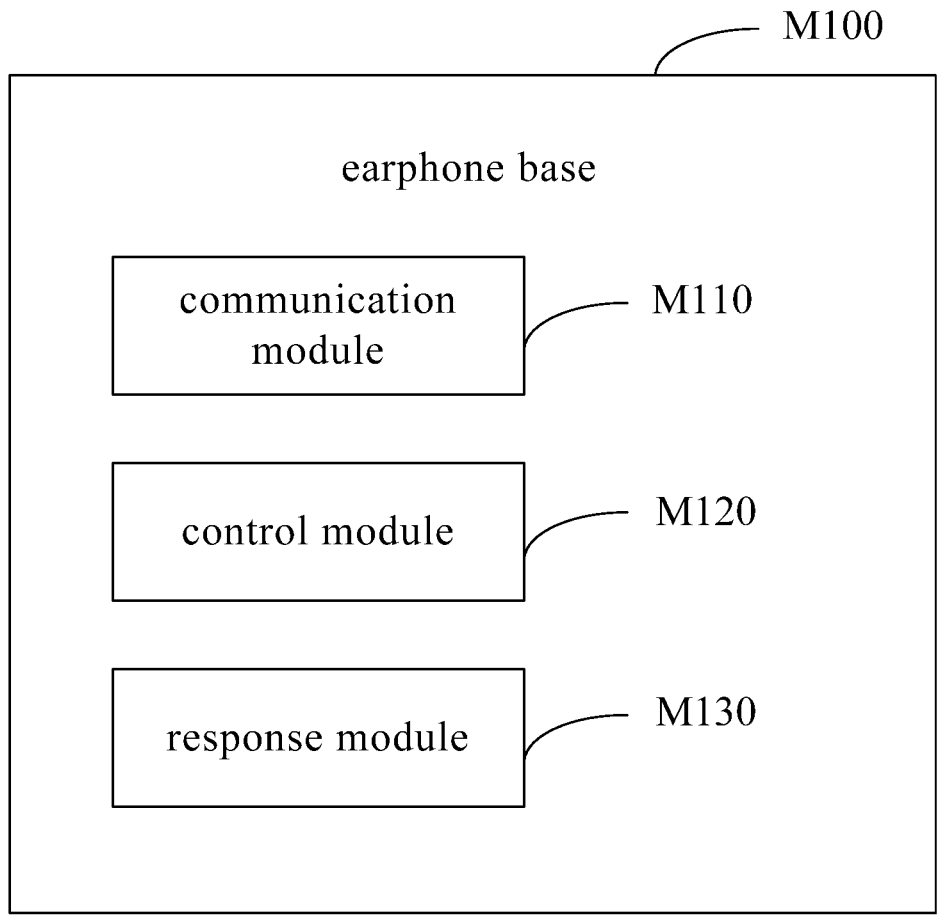
FIG. 2 is a structural schematic diagram illustrating an earphone base according to an embodiment of the present invention.

As shown in FIG. 2, the embodiment of the present invention is to provide an earphone base M100 for executing the method for selecting a response. The earphone base M100 comprises:
- a communication module M110, configured to send communication data to a user terminal and configured to detect whether a selection command for a wireless earphone sent from the user terminal is received and the communication data comprises a wireless earphone communication data and/or an earphone base communication data;
- a control module M120, configured to generate a response command when receiving the selection command.
- a response module M130, configured to perform a predetermined response action when receiving the response command from the control module M120.

By adopting the earphone base M100 of the present invention, the earphone base M100 establishes a connection with the user terminal through its own communication function or a connected wireless earphone, and sends the communication data of the earphone base M100 and/or the communication data of the wireless earphone to the user terminal for the user to view through the communication module M110. The control module M120 controls the response module M130 to respond when the earphone base M100 receives the selection command. The user can quickly find the corresponding earphone base M100 and the wireless earphone according to the response action. Therefore, even if the user is faced with a plurality of earphone bases M100 with the wireless earphone at the same time, the user can still find the wireless earphone the user needs quickly to save the time of selecting and searching for the wireless earphone.

In the embodiment, the earphone base M100 can be an open earphone support, and the earphone can be charged when the earphone is placed in the earphone support. The earphone support can be configured with clips, slots, tabs and other structures that are compatible with the earphone. The earphone base M100 can also be an earphone case which can be opened and closed. When putting the earphone into the earphone case, the earphone can be charged through the earphone case. The lid of the earphone case can be closed to accommodate the earphone in the earphone case, which is convenient for the user to carry.

The existing wireless earphone is mostly in a hibernate mode when being placed in the earphone base and cannot communicate with the user terminal M300. In the embodiment, when the wireless earphone M200 is placed in the earphone base M100, the wireless earphone M200 can be paired with and connected to the user terminal M300 to transmit the communication data and the selection command.

FIG. 3 to FIG. 6 show the schematic diagrams of the earphone base M100, the wireless earphone M200 and the user terminal M300 in four different embodiments, respectively.

Figure 3:
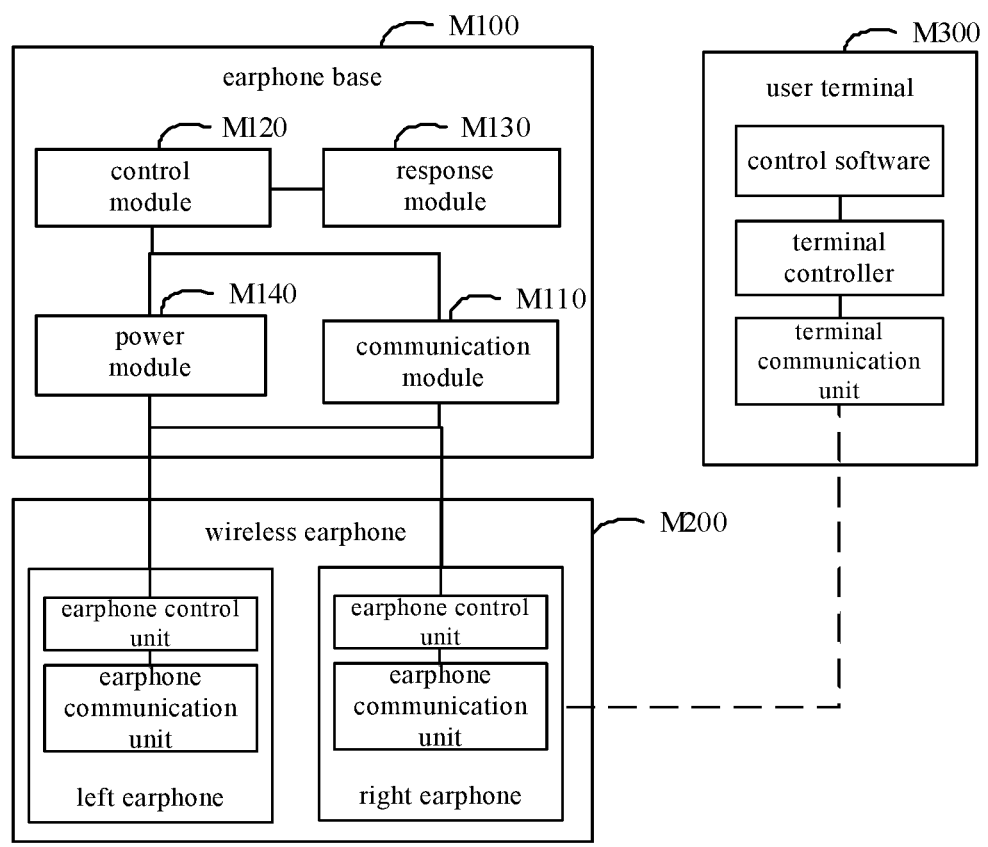
FIG. 3 is a schematic diagram illustrating an earphone base interacting with a wireless earphone and a user terminal according to an embodiment of the present invention.

As shown in FIG. 3, FIG. 3 is a schematic diagram illustrating an earphone base M100 interacting with a wireless earphone M200 and a user terminal M300 according to an embodiment of the present invention. In the embodiment, the communication module M110 of the earphone base M100 can be connected to the wireless earphone M200. The earphone base M100 can also comprise a power module M140, and the power module M140 provides electrical power to the wireless earphone M200. After the earphone base M100 is connected to the wireless earphone M200, the power module M140 provides electrical energy to the wireless earphone M200 through a connection interface (e.g. a pin), and the communication module M110 transmits data to an earphone control unit of the wireless earphone M200 through the connection interface. In the embodiment, the communication module M110 can be a wired communication module or a wireless communication module that transmits data with the wireless earphone M200.

In the embodiment, the wireless earphone M200 establishes a first connection channel with the user terminal M300 after pairing through Bluetooth. The step S110 sends the communication data to the user terminal M300, comprising the earphone base M100 sending the communication data of the earphone base M100 to the wireless earphone M200, and the wireless earphone M200 sending the communication data of the earphone base M100 and/or its own communication data to the user terminal M300 through the first connection channel. After receiving the communication data through a terminal communication unit of the user terminal M300, a terminal controller displays the received communication data in a user interface of a control software.

The step S120 detects whether the selection command for the wireless earphone M200 sent from the user terminal M300 is received, and the wireless earphone M200 detects whether the selection command for the wireless earphone M200 sent from the user terminal M300 is received through the first connection channel. If received, the wireless earphone M200 sends the selection command to the earphone base M100.

Specifically, the user terminal M300 can be paired with one or more wireless earphone M200 at the same time, and receive the communication data sent from a plurality of wireless earphones M200 at the same time and display the communication data for the user to view. The user terminal M300 generates the selection command either based on a user's selection of the wireless earphone M200 or based on an automatic selection of a predetermined selection strategy for the wireless earphone M200 according to the communication data.

Figure 4:
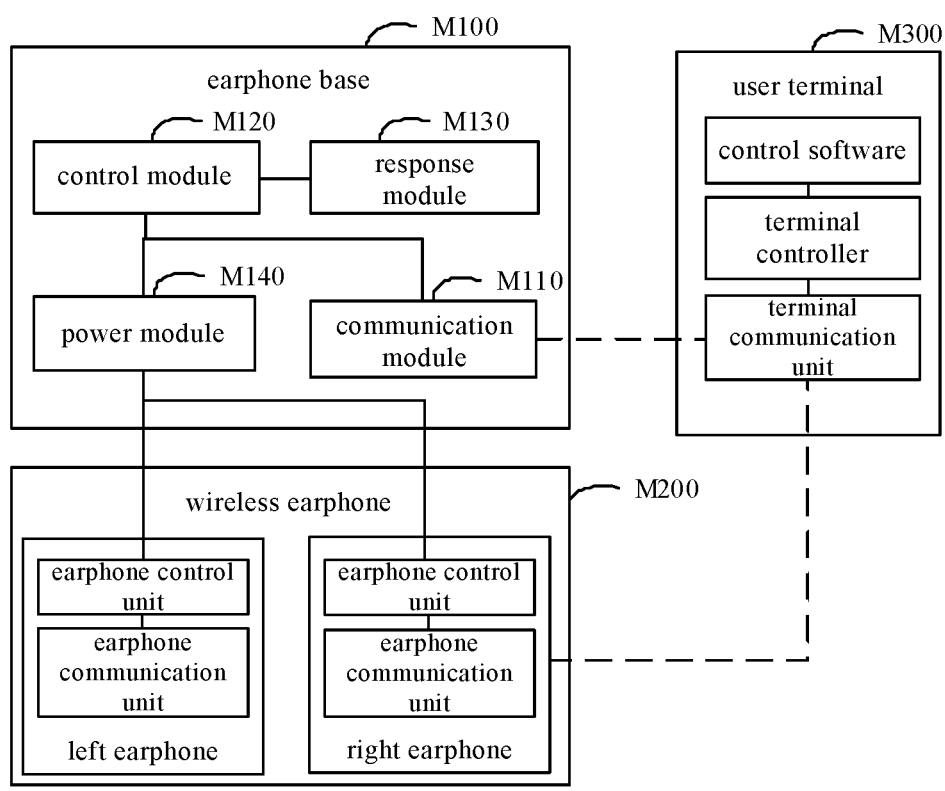
FIG. 4 is a schematic diagram illustrating an earphone base, a wireless earphone and a user terminal according to an embodiment of the present invention.

As shown in FIG. 4, FIG. 4 is a schematic diagram illustrating an earphone base M100, a wireless earphone M200 and a user terminal M300 according to another embodiment of the present invention. The present embodiment differs from the embodiment of FIG. 3 in that the communication module M110 of the earphone base M100 establishes a second connection directly with the user terminal M300, while the wireless earphone M200 establishes the first connection with the user terminal M300. The step S110 of sending the communication data to the user terminal M300 can comprise the communication module M110 of the earphone base M100 and the wireless earphone M200 communicating respectively with the user terminal M300 and sending their communication data to the user terminal M300 through the second connection channel and the first connection channel, respectively. The step S120 of detecting whether the selection command for the wireless earphone M200 sent from the user terminal M300 is received, which can be either by the wireless earphone M200 detecting whether the selection command for the wireless earphone M200 sent from the user terminal M300 is received through the first connection channel and/or by the communication module M110 detecting whether a selection command for the wireless earphone M200 sent from the user terminal M300 is received through the second connection channel.

Figure 5:
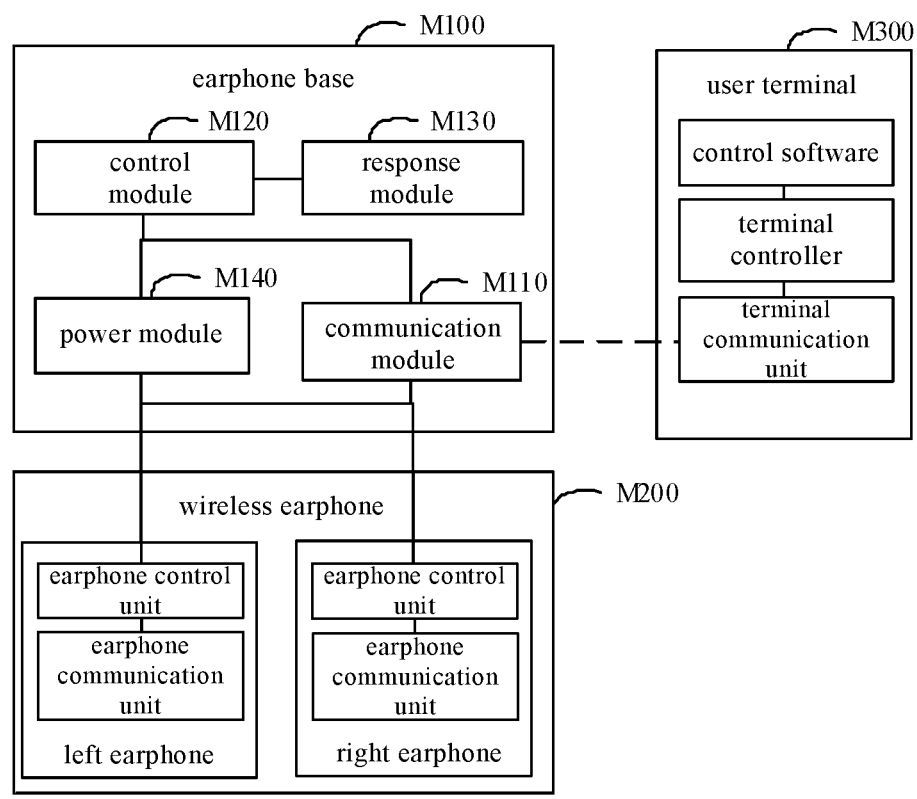
FIG. 5 is a schematic diagram illustrating an earphone base, a wireless earphone and a user terminal according to an embodiment of the present invention.

As shown in FIG. 5, FIG. 5 is a schematic diagram illustrating an earphone base M100, a wireless earphone M200 and a user terminal M300 according to another embodiment of the present invention. The present embodiment differs from the embodiment of FIG. 3 in that only the communication module M110 of the earphone base M100 establishes the second connection directly with the user terminal M300, and the communication module M110 of the earphone base M100 can also obtain the communication data of the wireless earphone M200 from the wireless earphone M200. In the step S110, the communication module M110 sends the communication data (the communication data of the earphone base M100 and/or the communication data of the wireless earphone M200) to the user terminal M300 through the second connection channel. In the step S130, the communication module M110 detects whether the selection command for the wireless earphone M200 sent from the user terminal M300 is received through the second connection channel. The earphone base M100 can establish the second connection channel with the user terminal M300 by Bluetooth pairing, but the invention is not limited to the aforementioned. In other alternative embodiment, the earphone base M100 can also establish the second connection channel with the user terminal M300 by other means of communication, such as WIFI and 4G.

In the step S110, sending the communication data to the user terminal M300 can comprise the earphone base M100 obtaining the communication data of the wireless earphone M200 from the wireless earphone M200, and then the communication module M110 of the earphone base M100 sending its own communication data and/or the communication data of the wireless earphone M200 to the user terminal M300 through the first connection channel. After the communication data is received by the terminal communication unit of the user terminal M300, the terminal controller displays the received communication data in the user interface of the control software.

Specifically, the user terminal M300 can be paired with one or more earphone base M100 at the same time, receive the communication data sent from a plurality of earphone bases M100 at the same time and display the communication data for the user to view. The user terminal M300 generates the selection command either based on a user's selection of the wireless earphone M200 or based on an automatic selection of a predetermined selection strategy for the wireless earphone M200 according to the communication data.

In another alternative embodiment, the communication module M110 can communicate only with the user terminal M300 and not with the wireless earphone M200. In the step S110, sending the communication data to the user terminal M300 can comprise the communication module M110 of the earphone base M100 sending the communication data of the earphone base M100 to the user terminal M300.

Figure 6:
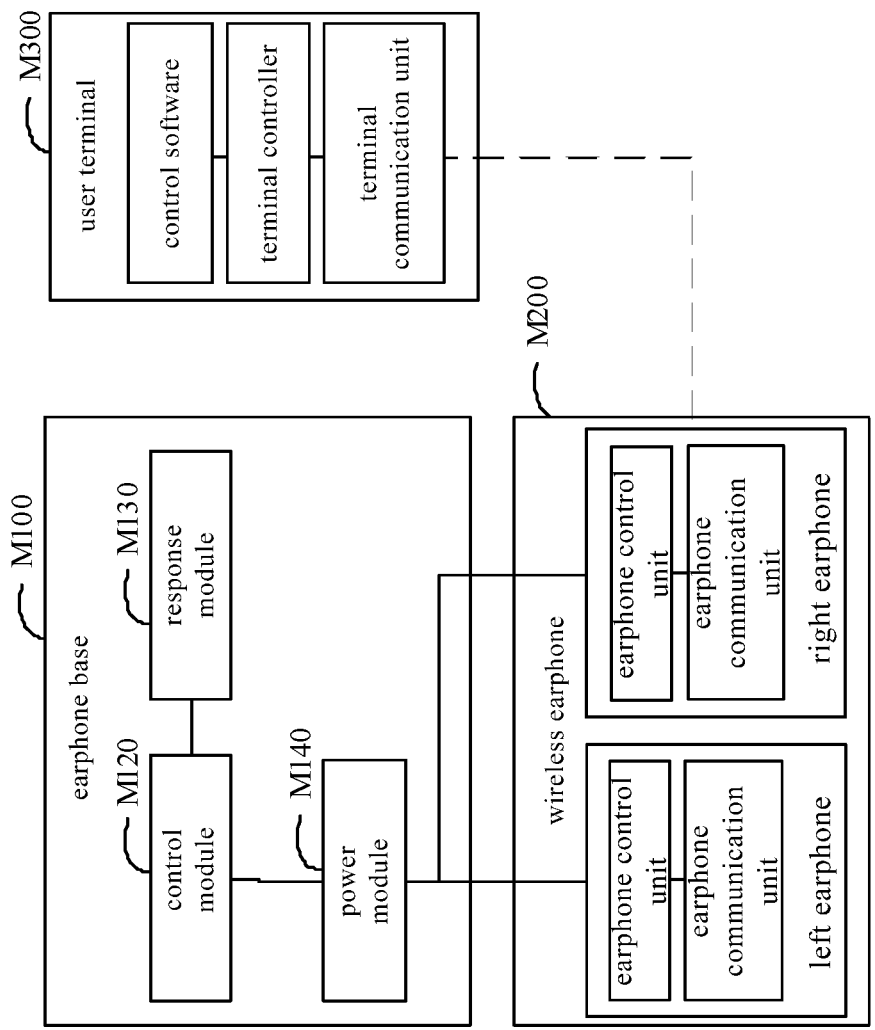
FIG. 6 is a schematic diagram illustrating an earphone base, a wireless earphone and a user terminal according to an embodiment of the present invention.

As shown in FIG. 6, FIG. 6 is a schematic diagram illustrating an earphone base M100, a wireless earphone M200 and a user terminal M300 according to another embodiment of the present invention. The present embodiment is the same as the embodiment of FIG. 3 in which the wireless earphone M200 establishes the first connection channel with the user terminal M300 after pairing through Bluetooth. The present embodiment differs from the embodiment of FIG. 3 in which the wireless earphone M200 does not communicate with the earphone base M100. When sending the communication data to the user terminal M300, only the communication data of the wireless earphone M200 is sent.

In a further alternative embodiment, when the user terminal M300 is faced with a plurality of wireless earphones M200 at the same time, it is also possible for some of the wireless earphone M200 to send the communication data to the user terminal M300 and some of the earphone base M100 to send the communication data to the user terminal M300. For the same group of the wireless earphone M200 and the earphone base M300 (i.e., the wireless earphone M200 set in an earphone base M100 and connected to the earphone base are the same group as the earphone base M100), it is also possible for the wireless earphone M200 to send its own communication data to the user terminal M300 and the earphone base M300 to send its own communication data to the user terminal M300.

In yet another embodiment, it is also possible to send only the communication data of the wireless earphone M200 to the user terminal M300 without sending the communication data of the earphone base M100 to the user terminal M300. In another embodiment, it is also possible to send only the communication data of the earphone base M100 to the user terminal M300 without sending the communication data of the wireless earphone M200 to the user terminal M300.

Figure 7:
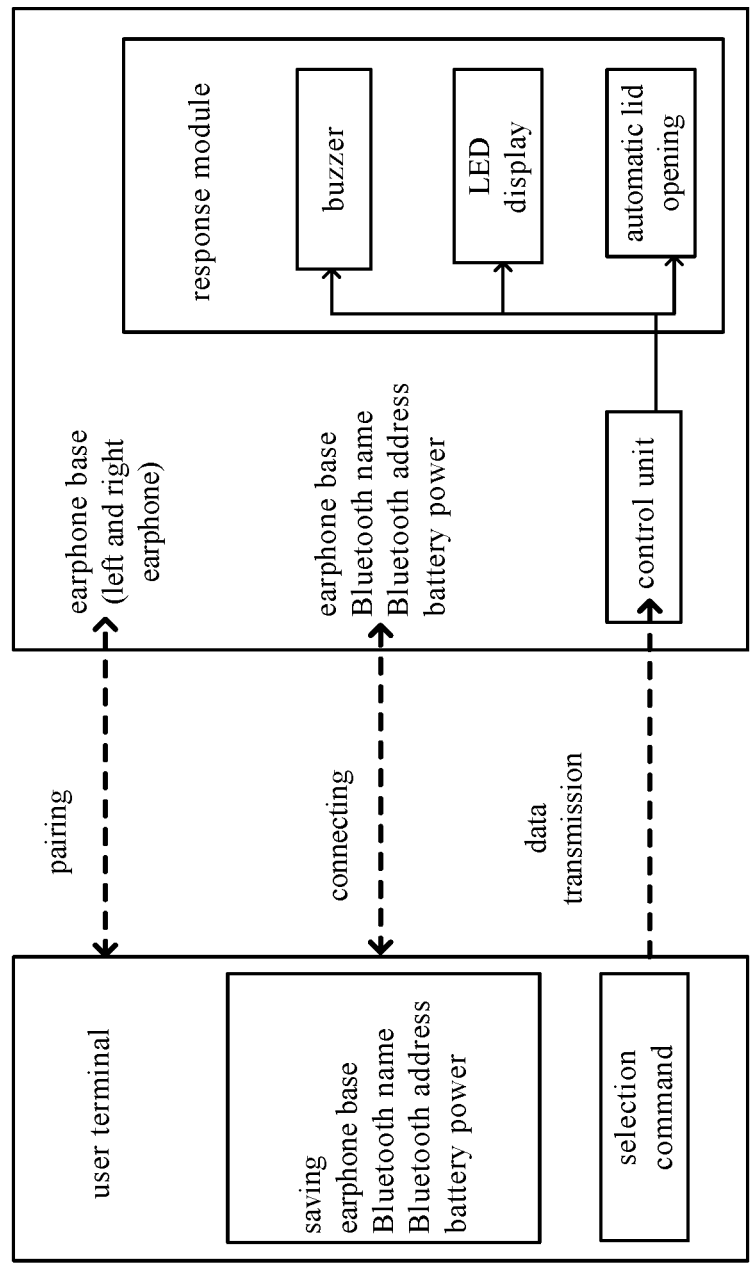
FIG. 7 is a process schematic diagram illustrating an earphone base interacting with a wireless earphone and a user terminal according to an embodiment of the present invention.

Please refer to FIG. 7. FIG. 7 is a process schematic diagram illustrating an earphone base interacting with a wireless earphone and a user terminal according to an embodiment of the present invention. As shown in FIG. 7, in the present embodiment, the communication data of the earphone base comprise an identifier information and status data of the earphone base, and the communication data of the wireless earphone comprises an identifier information and status data of the wireless earphone. Wherein, the identifier information of the earphone base can include the Bluetooth name, Bluetooth address, etc. of the earphone base. The identifier information of the wireless earphone can include the Bluetooth name, Bluetooth address, etc. of the wireless earphone. The status data of the earphone base can include the remaining battery power of the earphone base, whether it is malfunctioning, etc., and the status data of the wireless earphone can include the remaining battery power of the wireless earphone, whether it is malfunctioning, etc.

The user terminal receives the communication data and saves it. The user terminal can display the communication data in an interactive interface of the control software for a selection of the wireless earphone by the user, or the user terminal can select the wireless earphone directly according to the communication data and a predetermined selection strategy for the wireless earphone, generate the selection command, and then send the selection command to the wireless earphone or earphone base.

The response module M130 can include one or more of buzzers, LED displays, LED display lights, and lid opening mechanisms. The step S130 of controlling the earphone base corresponding to the selection command to execute a pre-determined response action comprises the control module M120 of the earphone base M100 controlling the response module M130 to execute at least one of the following actions:

the buzzer making a responsive sound to alert the user to the position of the earphone base M100;
the LED display or the LED display light displaying a reminder information, wherein, the reminder information can be a text reminder or a specific color light reminder; or
the lid opening mechanism opening a lid of the earphone base so that the user can quickly know which pair of wireless earphones M200 is selected.

In the present embodiment, the earphone base can further include an ejector mechanism for lifting up the wireless earphone after the lid of the earphone base is opened automatically.

In the present embodiment, after the response module M130 receives the response command, the response module M130 can notify the wireless earphone M200 to pair with and connect to the user terminal M300 through the connection interface of the wireless earphone M200.

Figure 8:
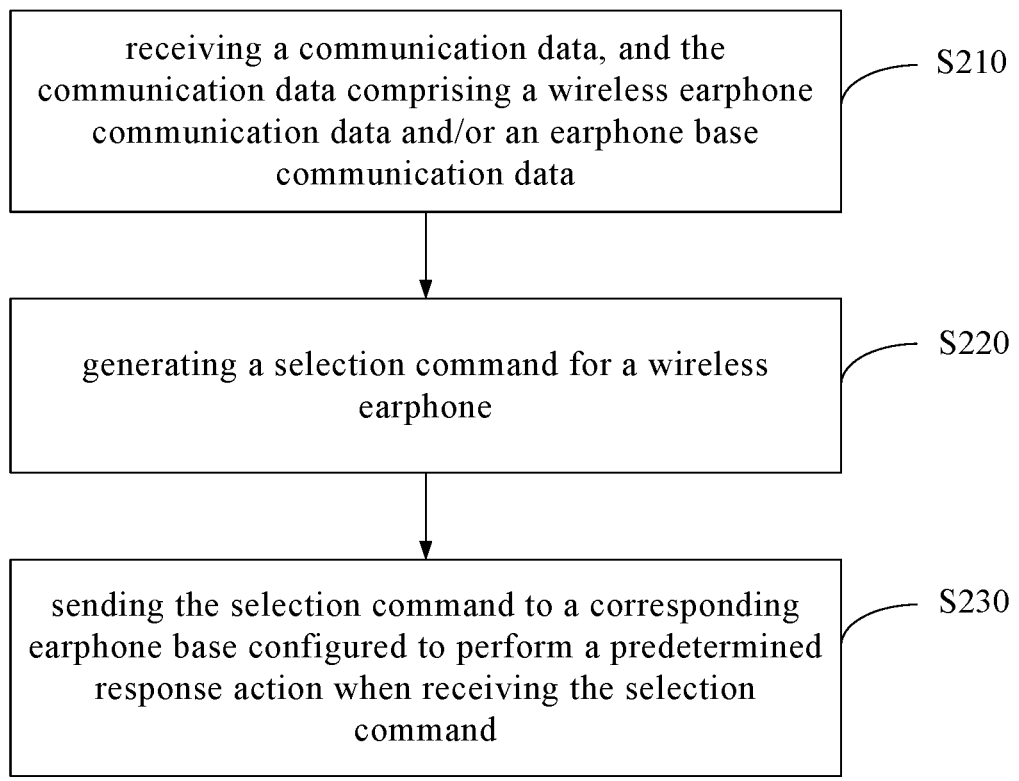
FIG. 8 is a flowchart diagram illustrating a method of selecting a wireless earphone according to an embodiment of the present invention.

As shown in FIG. 8, the embodiment of the present invention is to provide a method of selecting a wireless earphone, comprising the following steps:

step S210: receiving communication data, and the communication data comprising a wireless earphone communication data and/or an earphone base communication data;
step S220: generating a selection command for a wireless earphone; and
step S230: sending the selection command to a corresponding earphone base configured to perform a predetermined response action when receiving the selection command.

By adopting the earphone base of the present invention, the earphone base establishes a connection with the user terminal through its own communication function or a connected wireless earphone. By the step S210, the user terminal receives the wireless earphone communication data and/or the earphone base communication data for the user to view. By the step S220, the selection command for the wireless earphone is generated. By the step S230, the selection command is sent to the earphone base, and the earphone base responds when receiving the selection command. The user can quickly find the corresponding earphone base and the wireless earphone according to the response action, which saves the time of selecting and searching for the wireless earphone.

The method of selecting a wireless earphone as shown in FIG. 8 can be performed by the user terminal. The user terminal is a terminal device that carries the control software used by the user, such as a cell phone, a tablet computer, a notebook computer, a desktop computer.

In the present embodiment, the step S210 of receiving the communication data comprises receiving the communication data from the earphone base or the wireless earphone M200.

In the embodiment, the communication data of the earphone base comprises an identifier information and/or status data of the earphone base, and the communication data of the wireless earphone comprises an identifier information and/or status data of the wireless earphone. For example, the identifier information of the earphone base can include the a Bluetooth name, a Bluetooth address, etc. of the earphone base; the status data of the earphone base can include the remaining battery power of the earphone base, whether it is malfunctioning; the identifier information of the wireless earphone can include a Bluetooth name, a Bluetooth address, etc. of the wireless earphone; and the status data of the wireless earphone can include the remaining battery power of the wireless earphone, whether it is malfunctioning.

In an implementation of the embodiment, the step S220 of generating the selection command for the wireless earphone comprises the following steps of:

displaying a selection page of the wireless earphone according to the communication data, the selection page of the wireless earphone including the communication data of each of the wireless earphones paired with the users terminal and the earphone base;
receiving a selection of the selection page of the wireless earphone from a user; and
generating the selection command according to the selection from the user.

In an embodiment, the communication data can include only the identifier information of the wireless earphone, and the user can select the wireless earphone that the user wants to use directly based on the Bluetooth name of the wireless earphone that the user is familiar with when viewing the selection page of the wireless earphone on the user terminal. The user terminal sends the selection command to the wireless earphone or to the earphone base connected to the wireless earphone according to the user's selection of the wireless earphone. The wireless earphone notifies the connected earphone base to perform the predetermined response action when receiving the selection command. The earphone base performs the predetermined response action when receiving the selection command.

In an alternative embodiment, the communication data can include the identifier information of the earphone base and/or the identifier information of the wireless earphone, and include the status data of the earphone base and/or the status data of the wireless earphone, such as remaining battery power. The user can select a combination with the higher remaining battery power based on the remaining battery power of the earphone base and/or the remaining battery power of the wireless earphone, when viewing the selection page of the wireless earphone on the user terminal.

In another implementation of the embodiment, instead of the user selecting the wireless earphone, the wireless earphone can be selected based on a predetermined selection strategy for the wireless earphone. Specifically, the step S220 of generating the selection command for the wireless earphone further comprises the following steps of:

selecting the wireless earphone according to the communication data and the predetermined selection strategy for the wireless earphone; and generating the selection command according to the selection of the wireless earphone and the earphone base.

The step of selecting the wireless earphone and the earphone base according to the communication data and the predetermined selection strategy for the wireless earphone further comprises the following steps:

obtaining a data weight value of the wireless earphone and a data weight value of the earphone base set in the selection strategy for the wireless earphone;

weighting and summing up the status data of the wireless earphone and the status data of the earphone base according to the data weight value of the wireless earphone and the data weight value of the earphone base to obtain a selection parameter of the wireless earphone; and selecting the wireless earphone according to the selection parameter of the wireless earphone.

Furthermore, the selection strategy for the wireless earphone comprises the data weight value of the wireless earphone and the data weight value of the earphone base for a plurality of application scenarios. That is, a plurality of different application scenarios can be preconfigured, and the data weight values of the wireless earphone and the data weight values of the earphone base for the plurality of different application scenarios can be different to meet the needs of the different application scenarios.

The step of obtaining the data weight value of the wireless earphone and the data weight value of the earphone base set in the selection strategy for the wireless earphone further comprising the following steps of:

obtaining the current selection of a scenario; and obtaining the data weight value of the wireless earphone and the data weight value of the earphone base corresponding to the currently selected scenario. The selection of this scenario can be selected by the user in a scenario selection page, or by the user terminal control software to automatically identify the current application scenario.

Figure 9:
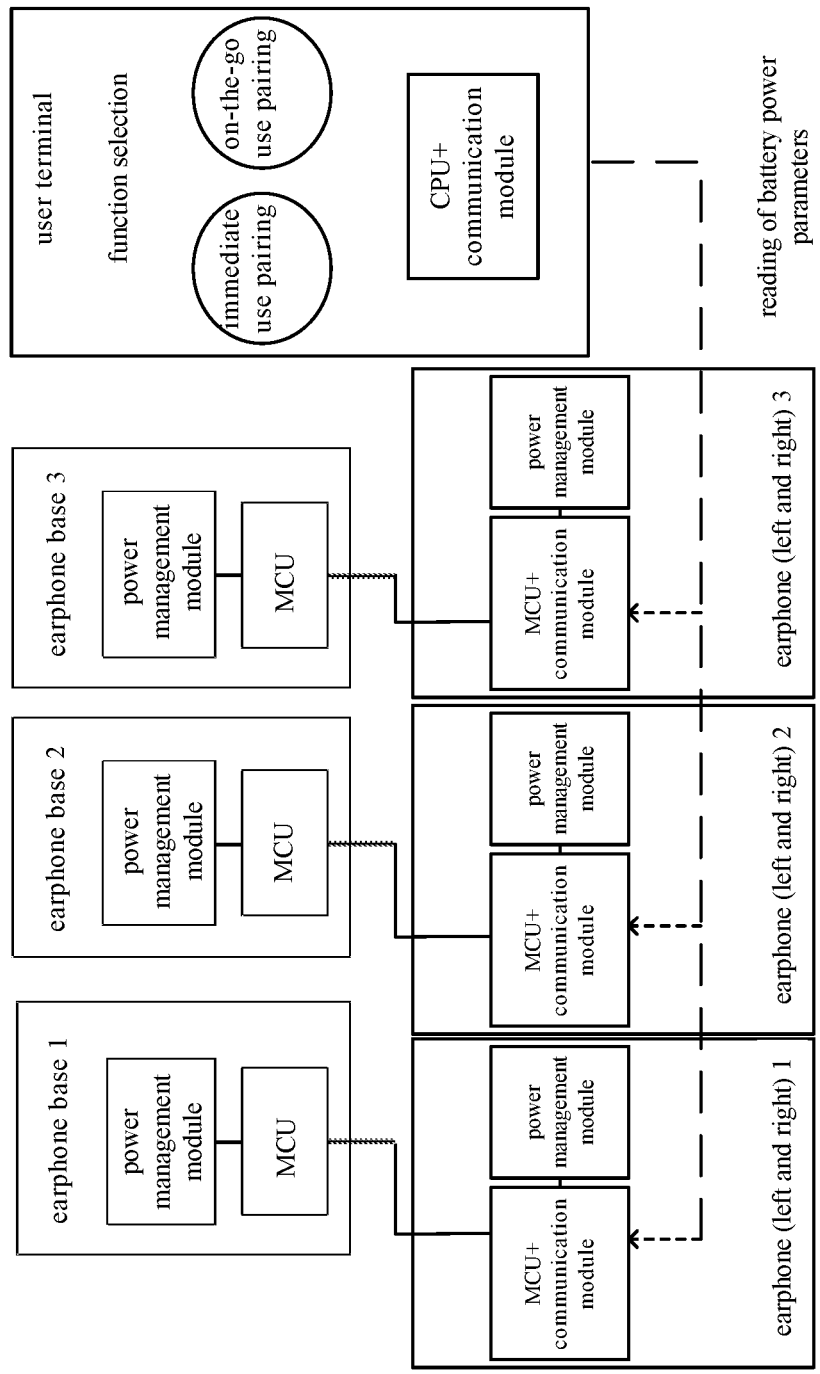
FIG. 9 is a schematic diagram illustrating a user terminal communicating with a plurality of earphone bases simultaneously according to an embodiment of the present invention.
Figure 10:
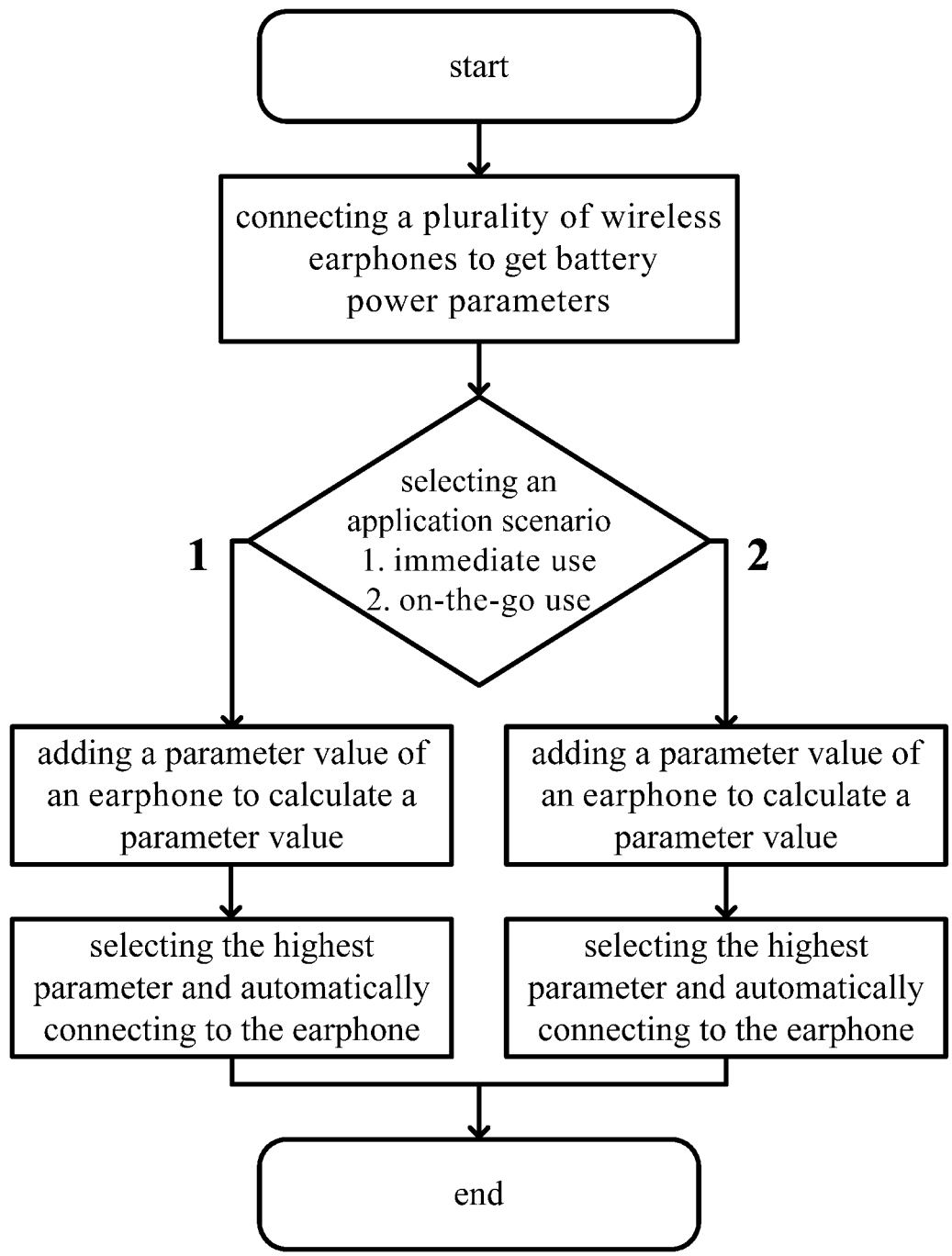
FIG. 10 is a flowchart diagram illustrating a method of selecting an earphone base on an application scenario and selection strategy according to an embodiment of the present invention.

The following is a description for an embodiment of the selection strategy for the wireless earphone by combining FIG. 9 and FIG. 10. In the embodiment, the communication data includes the identifier information of the wireless earphone, the remaining battery power of the earphone base, and the remaining battery power of the wireless earphone.

In the embodiment, two application scenarios are set, one for immediate use scenario and the other for on-the-go use scenario. In the immediate use scenario, the remaining battery power of the wireless earphone itself is more important, so the data weight value of the wireless earphone is higher than the data weight value of the earphone base. In the on-the-go use scenario, the remaining battery power of the earphone base is more important, so the data weight value of the earphone base is higher than the data weight value of the wireless earphone.

For example, a battery power parameter is set to 1 when there is one cell remaining, and set to 2, 3, and 4 when there are two, three, and four cells remaining, respectively. In the immediate use scenario, the data weight value of the wireless earphone is 1.5 and the data weight value of the earphone base is 1. In the on-the-go use scenario, the data weight value of the earphone base is 1.5 and the data weight value of the wireless earphone is 1.

In a combination A (including a wireless earphone and an earphone base), the battery power parameter of the wireless earphone (left and right earphones) is 1, and the battery power parameter of the earphone base is 4. In a combination B (including a wireless earphone and an earphone base), the battery power parameter of the wireless earphone is 3, and the battery power parameter of the earphone base is 1.

In the immediate use scenario, the selection parameter of the combination A=1×1.5 (the left earphone)+1×1.5 (the right earphone)+4 (the earphone base)=7, and the selection parameter of the combination B=3×1.5 (the left earphone)+3×1.5 (the right earphone)+1 (the earphone base)=10. In this scenario, the wireless earphone in combination B should be selected to better meet the usage needs for immediate use.

In the on-the-go use scenario, the selection parameter of the combination A=1 (the left earphone)+1 (the right earphone)+4×1.5 (the earphone base)=8, and the selection parameter of the combination B=3 (the left earphone)+3 (the right earphone)+1×1.5 (the earphone base)=7.5. In this scenario, the wireless earphone in combination A should be selected to better meet the usage needs for on-the-go use.

In another alternative embodiment, the earphone can be selected directly according to different data parameters in different scenarios. For example, in the immediate use scenario, the data parameter with the highest battery power of the earphone is selected directly; and in the on-the-go use scenario, the data parameter with the highest power of the earphone base is selected directly.

Figure 11:
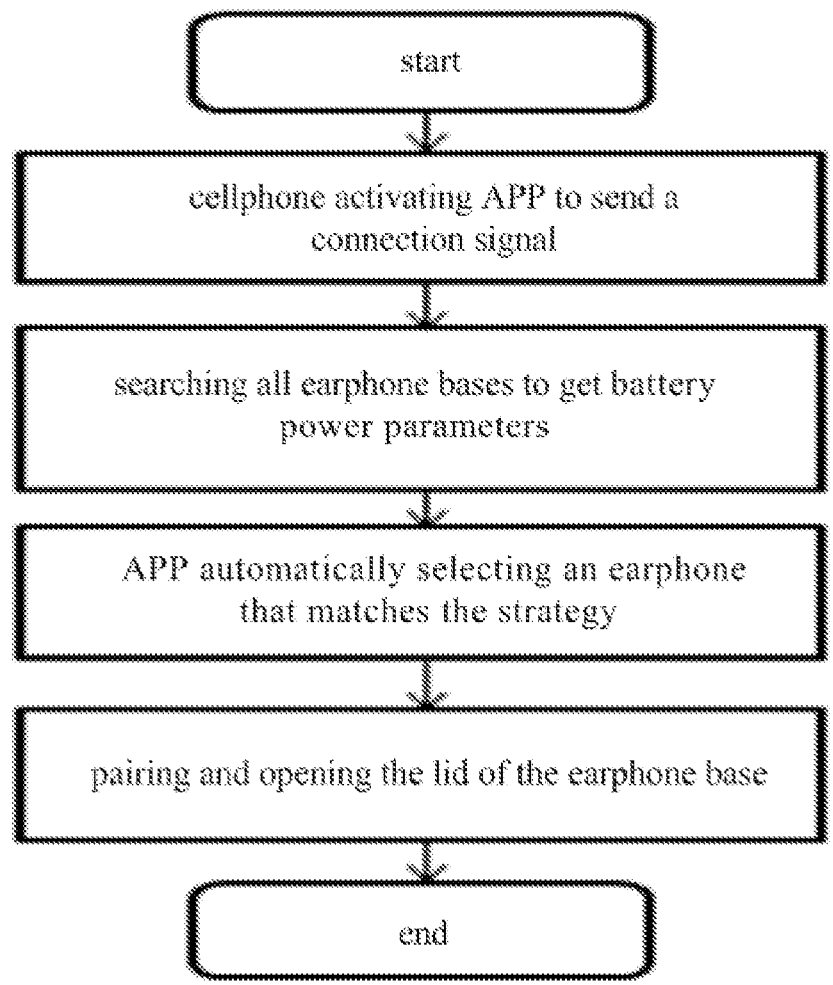
FIG. 11 is a flowchart diagram illustrating a method of selecting a wireless earphone applied to a specific scenario according to an embodiment of the present invention.

As shown in FIG. 11, FIG. 11 is a flowchart diagram illustrating a method of selecting a wireless earphone applied to a specific scenario according to an embodiment of the present invention. In this scenario, multiple sets of public earphone are provided at an exhibition venue for artwork interpretation services. When visitors make earphone selection, the scenario can be automatically set to an immediate use scenario since it is for immediate use. When the user selects the earphone, the user first activates the control software in the user terminal, the control software sends a connection signal and automatically pairs with all the available earphone bases, gets the battery power of the wireless earphones from the earphone bases, and automatically selects the wireless earphone with the highest battery power. After the earphone base is opened, the power chip of the power module is triggered by the Hall sensor to send a signal to wake up the wireless earphone via the pogo pin. The user terminal sends the selection command for the earphone to the corresponding earphone base. The earphone base that receives the selection command automatically opens the lid and notifies the wireless earphone to automatically pair with the user terminal by Bluetooth. The earphone base opens the lid and uses a Hall sensor to trigger a power chip of a power module to send a signal to wake up the wireless earphone through a pin.

The embodiment of the present invention is to provide a wireless earphone selection device comprising a processor and a memory in which an executable command of the processor is stored. Wherein the processor is configured to perform the steps of the method of selecting a wireless earphone by executing the executable command.

Those skilled in the art can understand that aspects of the present invention can be realized as systems, methods, or program products. Accordingly, the aspects of the present invention can be specifically realized in the form of a fully hardware embodiment, a fully software embodiment (including firmware, microprograms, etc.), or a combined hardware and software embodiment, herein referred to collectively as a "circuit", "module", or "platform".

An electronic device 600 according to the embodiment of the present invention is described below with reference to FIG. 12. The electronic device 600 shown in FIG. 12 is merely an example and should not impose any limitations on the functionality and scope of use of the embodiment of the present invention.

Figure 12:
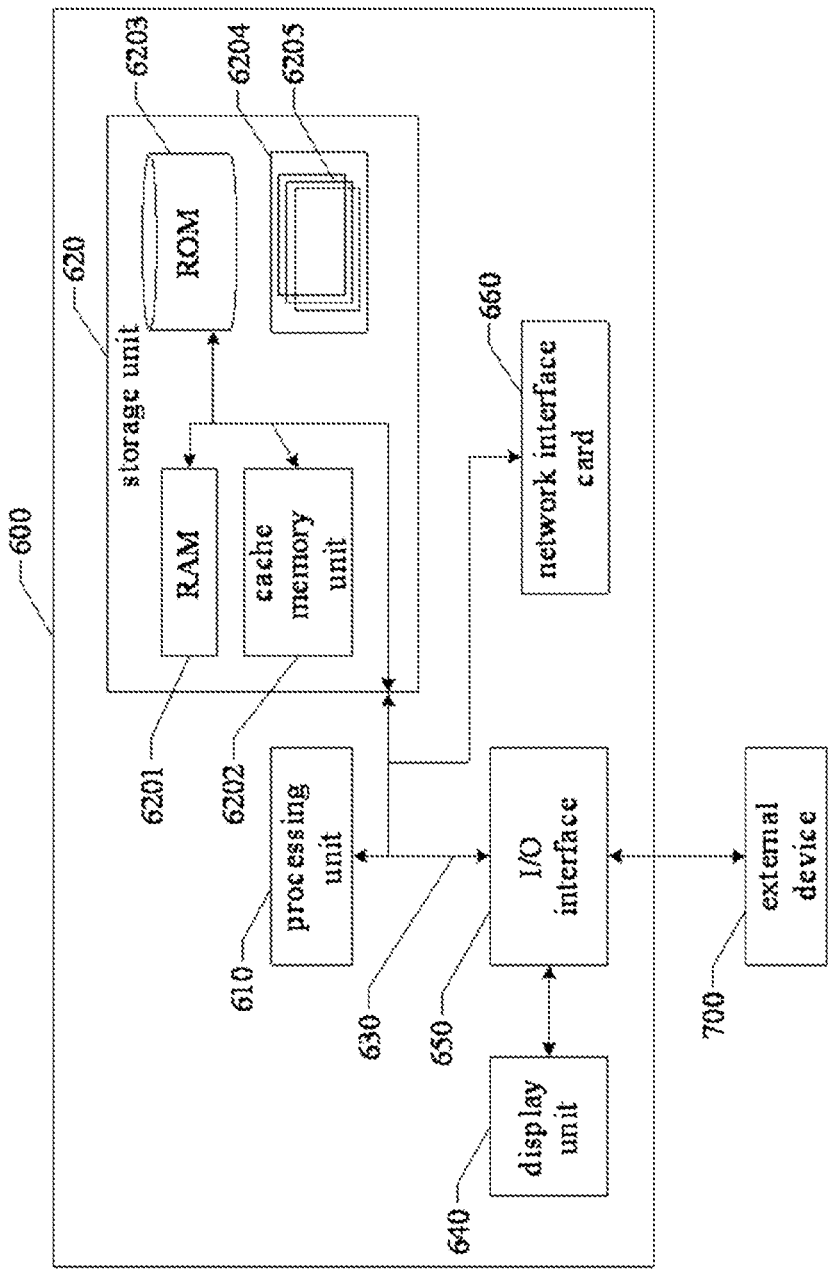
FIG. 12 is a structural schematic diagram illustrating a wireless earphone selection device according to an embodiment of the present invention.

As shown in FIG. 12, the electronic device 600 is presented in the form of a general-purpose computing device. Components of the electronic device 600 can comprise, but are not limited to at least one processing unit 610, at least one storage unit 620, a bus 630 for selecting different system components (including the storage unit 620 and the processing unit 610), a display unit 640.

Wherein, the storage unit stores a program code, and the program code can be executed by the processing unit 610, so the processing unit 610 performs the steps of various exemplary embodiments according to the present invention as described in the portion of the method of selecting a wireless earphone above-mentioned in this specification. For example, the processing unit 610 can perform the steps shown in FIG. 8.

The storage unit 620 can comprise a readable media in a form of a volatile memory unit, for example a random access memory unit (RAM) 6201 and/or a cache memory unit 6202, and can further comprise a read-only memory unit (ROM) 6203.

The storage unit 620 can also comprise a program/utility tool 6204 having a set (at least one) of program modules 6205. The program modules 6205 comprise, but are not limited to an operating system, one or more applications, other program modules, and program data. Each of these examples, or some combination thereof, can comprise an implementation of a network environment.

The bus 630 can indicate one or more of several types of bus structures, comprising a storage unit bus or a storage unit controller, a peripheral bus, an accelerated graphics port, a processing unit, or a local bus using any of the several types of bus structures.

The electronic device 600 can be in communication with one or more external devices 700 (e.g., keyboards, pointing devices, Bluetooth devices), and can also be in communication with one or more devices that enable a user to interact with the electronic device 600, and/or with any device (e.g., routers, modems) that enables the electronic device 600 to communicate with one or more other computing devices. The communication can be performed by an input/output (I/O) interface 650. Further, the electronic device 600 can communicate with one or more networks (e.g., a local area network (LAN), a wide area network (WAN), and/or a public network, such as the Internet) by a network interface card 660. The network interface card 660 can communicate with other modules of the electronic device 600 by the bus 630. It should be understood that, although not shown in the figures, other hardware and/or software modules can be used in conjunction with the electronic device 600, including, but not limited to a microcode, a device driver, a redundancy unit, an external disk drive array, a RAID system, a tape drive, and a data backup storage system.

In the wireless earphone selection device, a program in the memory is executed by the processor to implement the steps of the method of selecting a wireless earphone, so the device can also obtain the technical effect of the method of selecting a wireless earphone aforementioned.

The embodiment of the present invention is to provide a computer-readable storage medium is configured to store a program, and the program is executed by the processor to implement the steps of the method of selecting a wireless earphone.

In some possible embodiments, aspects of the present invention can also be realized in the form of a program product comprising a program code. When the program product is executed on a terminal device, the program code is configured to enable the terminal device to perform the steps of various exemplary embodiments according to the present invention as described in the portion of the method of selecting a wireless earphone above-mentioned in this specification.

Figure 13:
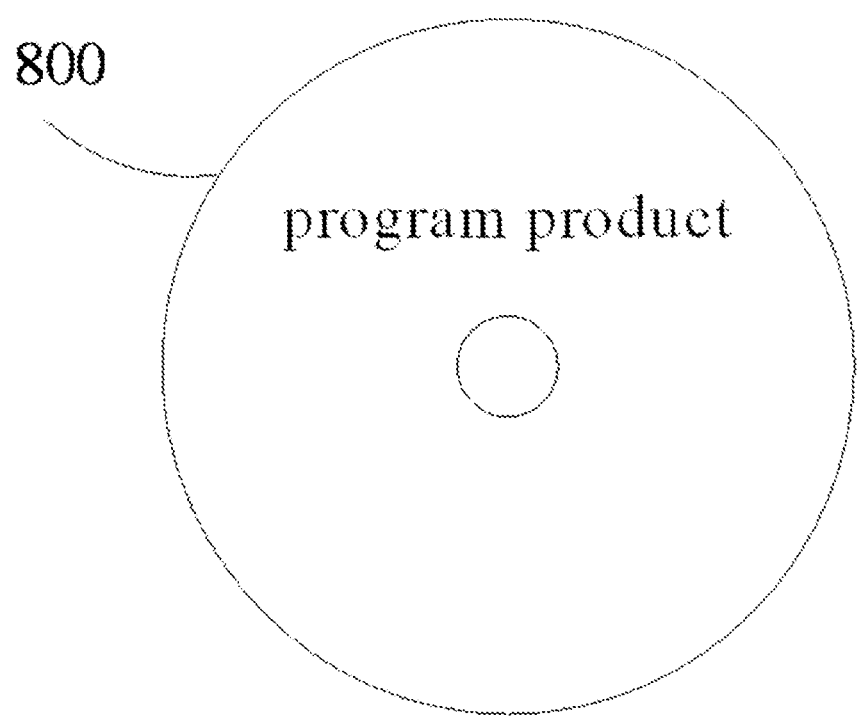
FIG. 13 is a structural schematic diagram illustrating a computer-readable storage medium according to an embodiment of the present invention.

Please refer to FIG. 13. FIG. 13 describes a program product 800 for implementing the method shown in FIG. 8 above-mentioned according to the embodiment of the present invention. The program product 800 takes a portable compact disc read-only memory (CD-ROM) and comprises the program code, and which can be executed on an end device, such as a personal computer. However, the program product of the present invention is not limited to the aforementioned. In the present invention, the readable storage medium can be any tangible medium that comprises or stores a program, and the program can be used by or in conjunction with a command execution system, device, or component.

The program product can be any combination of one or more readable media. The readable medium can be a readable signal medium or a readable storage medium. The readable storage medium can be, but is not limited to an electrical, magnetic, optical, electromagnetic, infrared, or semiconductor system, device, component, or any combination thereof. More specific examples of readable storage media (a non-exhaustive list) include: a electrical selection with one or more wires, a portable disk, a hard disk, a random-access memory (RAM), a read-only memory (ROM), an erasable programmable read-only memory (EPROM or a flash memory), an optical fiber, a portable compact disc read-only memory (CD-ROM), an optical memory device, a magnetic memory device, or any suitable combination of the aforementioned.

The computer-readable storage medium can comprise a data signal in the baseband or as part of a carrier wave, which carries readable program code. The propagated data signal can be in various forms, including, but not limited to electromagnetic signals, optical signals, or any suitable combination of the aforementioned. The readable storage medium can also be any readable medium beside the readable storage medium. The readable medium can send, propagate, or transmit the program for use by or in conjunction with the command execution system, device, or component. The program code contained in the readable storage medium can be transmitted by any suitable medium, including, but not limited to wireless, wired, optical, RF, or any suitable combination thereof.

The program code for performing the operations of the present invention can be written in any combination of one or more programming languages, including object-oriented programming languages such as Java, C++, and conventional procedural programming languages such as "C" or similar programming languages. The program code can run entirely on a user computing device, partially on the user computing device, as a separate package, partially on the user computing device and partially on a remote computing device, or entirely on the remote computing device or server. In cases involving the remote computing device, the remote computing device can be selected to the user computing device over any type of network, including a local area network (LAN) or a wide area network (WAN), or can be selected to an external computing device (e.g., by utilizing an Internet service provider to select over the Internet).

In the wireless earphone selection device, a program in the memory is executed by the processor to implement the steps of the method of selecting a wireless earphone, so the device can also obtain the technical effect of the method of selecting a wireless earphone aforementioned.

The steps of the method of selecting a wireless earphone above-mentioned are realized when the program in the computer storage medium is executed by the processor, so the computer storage medium can also obtain the technical effect of the method of selecting a wireless earphone aforementioned.

The above is a further detailed description of the invention in combination with preferred embodiments, and it cannot be considered that the specific embodiment of the invention is limited to these descriptions. For a person having ordinary skill in the art, without departing from the concept of the invention, some simple derivations or substitutions can be made, which should be considered as falling within the scope of protection of the invention.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for selecting a response, comprising the following steps of:
   sending a wireless earphone communication data and an earphone base communication data to a user terminal, the wireless earphone communication data comprising an identifier information and a status data of a wireless earphone, the earphone base communication data comprising an identifier information and a status data of an earphone base;
   detecting whether a selection command for the wireless earphone sent from the user terminal is received; and
   controlling the earphone base corresponding to the selection command to execute a predetermined response action;
   wherein the step of sending the communication data to the user terminal further comprises the following steps of:
      the identifier information and the status data of the earphone base and/or the identifier information and the status data of the wireless earphone serving as the communication data sent to the user terminal through the earphone base or the wireless earphone, the user terminal is configured to display a selection page of the wireless earphone after receiving the communication data.

2. The method for selecting a response of claim 1, wherein the step of sending the communication data to the user terminal further comprises the earphone base sending the communication data to the user terminal, or the wireless earphone sending the communication data to the user terminal.

3. The method for selecting a response of claim 1, wherein the step of controlling the earphone base corresponding to the selection command to execute the predetermined response action further comprises controlling the earphone base corresponding to the selection command to execute at least one of the following actions of:
   the earphone base making a responsive sound;
   the earphone base displaying a reminder information;
   the earphone base opening a lid; and
   the earphone base notifying the wireless earphone to pair with and connect to the user terminal.

4. An earphone base for executing the method for selecting a response in claim 1, the earphone base comprising:
   a communication module, configured to send a communication data to a user terminal and configured to detect whether a selection command for a wireless earphone sent from the user terminal is received, the communication data comprising a wireless earphone communication data and/or an earphone base communication data;
   a control module, configured to generate a response command when receiving the selection command; and
   a response module, configured to perform a predetermined response action when receiving the response command from the control module.

5. The earphone base of claim 4, wherein the communication module establishes a connection channel with the user terminal, the communication module sends the communication data to the user terminal through the connection channel, and detects whether the selection command for the wireless earphone from the user terminal is received through the connection channel; or
   the communication module is connected to the wireless earphone, the communication data is sent to the user terminal through the wireless earphone, and detects whether the selection command for the wireless earphone from the user terminal is received through the wireless earphone.

6. A method of selecting a wireless earphone, comprising the following steps of:
   receiving a communication data, the communication data comprising a wireless earphone communication data and/or an earphone base communication data, the wireless earphone communication data comprising an identifier information and a status data of a wireless earphone, the earphone base communication data comprising an identifier information and a status data of an earphone base;

generating a selection command for a wireless earphone; and sending the selection command to a corresponding earphone base configured to perform a predetermined response action when receiving the selection command;

wherein the step of generating the selection command for the wireless earphone further comprises the following steps of:

displaying a selection page of the wireless earphone according to the communication data;

receiving a selection of the selection page of the wireless earphone from a user; and generating a selection command according to the selection from the user.

7. The method of selecting a wireless earphone of claim 6, wherein the step of receiving the communication data comprises receiving the communication data from the earphone base and/or a wireless earphone.

8. The method of selecting a wireless earphone of claim 6, wherein the step of generating the selection command for the wireless earphone further comprises the following steps of:

selecting the wireless earphone according to the communication data and a predetermined selection strategy for the wireless earphone; and generating the selection command according to a selection of the wireless earphone and the earphone base.

9. The method of selecting a wireless earphone of claim 8, wherein the communication data comprises a status data of the wireless earphone and a status data of the earphone base;

the step of selecting the wireless earphone and the earphone base according to the communication data and the predetermined selection strategy for the wireless earphone further comprising the following steps of:

obtaining a data weight value of the wireless earphone and a data weight value of the earphone base set in the selection strategy for the wireless earphone;

weighting and summing up the status data of the wireless earphone and the status data of the earphone base according to the data weight value of the wireless earphone and the data weight value of the earphone base to obtain a selection parameter of the wireless earphone; and selecting the wireless earphone according to the selection parameter of the wireless earphone.

10. The method of selecting a wireless earphone of claim 9, wherein the selection strategy for the wireless earphone comprises the data weight value of the wireless earphone and the data weight value of the earphone base for a plurality of scenarios; the step of obtaining the data weight value of the wireless earphone and the data weight value of the earphone base set in the selection strategy for the wireless earphone further comprising the following steps of:

obtaining the current selection of a scenario; and obtaining the data weight value of the wireless earphone and the data weight value of the earphone base corresponding to the currently selected scenario.

11. A wireless earphone selection device, comprising:
a processor; and
a memory, in which an executable command of the processor being stored;

wherein, the processor is configured to perform the following steps of:

receiving a communication data, the communication data comprising a wireless earphone communication data and/or an earphone base communication data, the earphone base communication data comprising an identifier information and/or a status data of the earphone base, and the wireless earphone communication data comprising an identifier information and/or a status data of the wireless earphone;

generating a selection command for a wireless earphone; and sending the selection command to a corresponding earphone base configured to perform a predetermined response action when receiving the selection command;

wherein the step of generating the selection command for the wireless earphone further comprises the following steps of:

displaying a selection page of the wireless earphone according to the communication data;

receiving a selection of the selection page of the wireless earphone from a user; and generating a selection command according to the selection from the user.

12. The wireless earphone selection device of claim 11, wherein the step of receiving the communication data comprises receiving the communication data from the earphone base and/or a wireless earphone.

13. The wireless earphone selection device of claim 11, wherein the step of generating the selection command for the wireless earphone further comprises the following steps of:

selecting the wireless earphone according to the communication data and a predetermined selection strategy for the wireless earphone; and generating the selection command according to a selection of the wireless earphone and the earphone base.

14. The wireless earphone selection device of claim 13, wherein the communication data comprises a status data of the wireless earphone and a status data of the earphone base;

the step of selecting the wireless earphone and the earphone base according to the communication data and the predetermined selection strategy for the wireless earphone further comprising the following steps of:

obtaining a data weight value of the wireless earphone and a data weight value of the earphone base set in the selection strategy for the wireless earphone;

weighting and summing up the status data of the wireless earphone and the status data of the earphone base according to the data weight value to obtain a selection parameter of the wireless earphone; and selecting the wireless earphone according to the selection parameter of the wireless earphone.

15. The wireless earphone selection device of claim 14, wherein the selection strategy for the wireless earphone comprises the data weight value of the wireless earphone and the data weight value of the earphone base for a plurality of scenarios; the step of obtaining the data weight value of the wireless earphone and the data weight value of the earphone base set in the selection strategy for the wireless earphone further comprising the following steps of:

obtaining the current selection of a scenario; and obtaining the data weight value of the wireless earphone and the data weight value of the earphone base corresponding to the currently selected scenario.

16. The earphone base of claim 4, wherein the predetermined response action further comprises controlling the earphone base corresponding to the selection command to execute at least one of the following actions of:
- the earphone base making a responsive sound;
- the earphone base displaying a reminder information;
- the earphone base opening a lid; and
- the earphone base notifying the wireless earphone to pair with and connect to the user terminal.

* * * * *